UNITED STATES PATENT OFFICE.

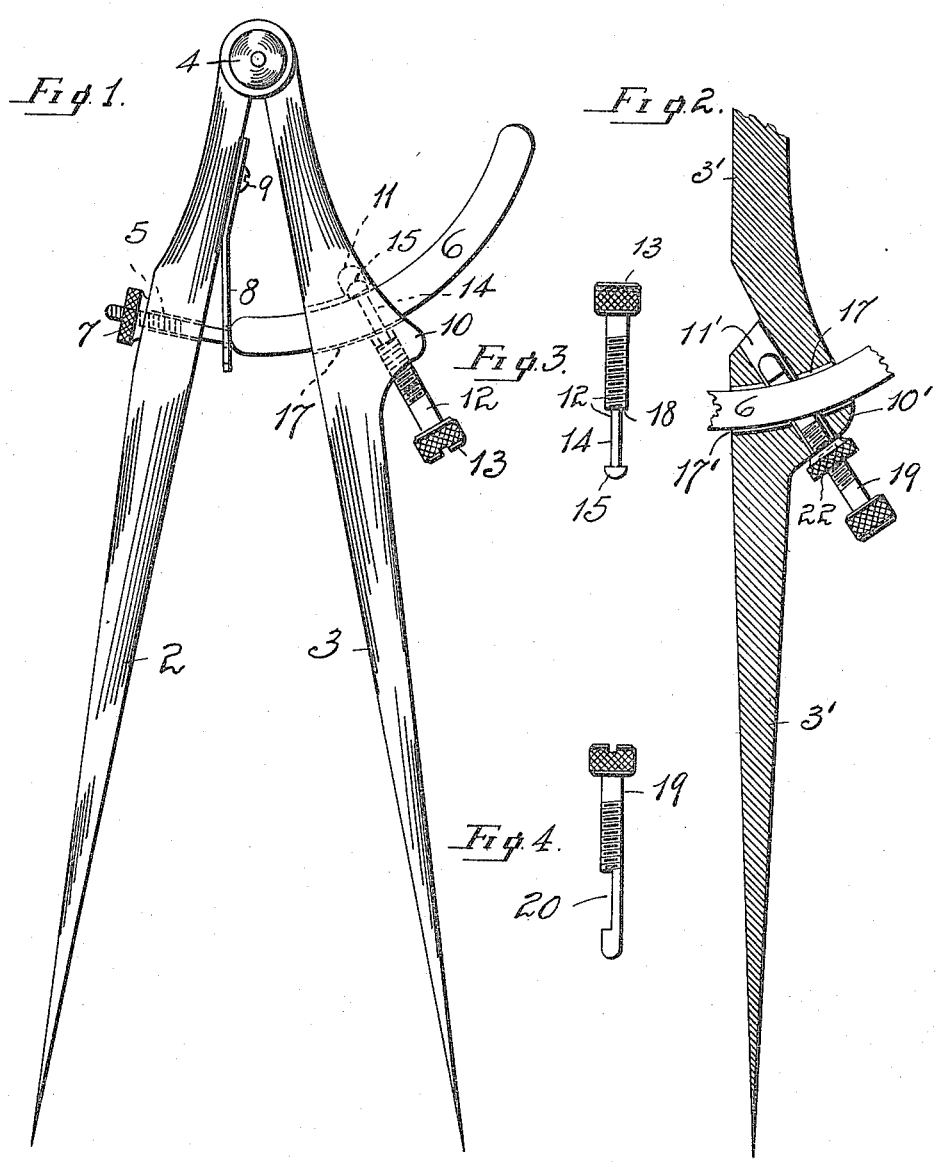

ANDERSON M. STRUBLE, OF GALESBURG, ILLINOIS.

COMPASSES.

1,160,782.  Specification of Letters Patent.  Patented Nov. 16, 1915.

Application filed July 6, 1915. Serial No. 38,192.

*To all whom it may concern:*

Be it known that I, ANDERSON M. STRUBLE, a citizen of the United States, and a resident of Galesburg, in the county of Knox and State of Illinois, have invented new and useful Compasses, of which the following is a specification.

My invention relates to means for locking at predetermined distances apart the legs of instruments for measuring lines, etc., for describing arcs of circles, circles, etc., and it consists, substantially, in the improvements herein described.

In the accompanying drawings, which illustrates my invention: Figure 1 is a side elevation of a preferred form of compasses embodying my invention; Fig. 2, a modification—a longitudinal central section, partly in elevation; Fig. 3, a detail of the screw shown in Fig. 1; and Fig. 4, a detail of the screw shown in Fig. 2.

Considerings said drawings in detail and referring to each element, and, where necessary, to each part thereof, by a distinguishing reference numeral, uniformly employed, 2 indicates a relatively stationary leg and 3 a relatively movable leg hinged to the leg 2 by a compass-joint 4. The leg 2 has a transversely cut aperture 5 through which passes a spacing-plate or segment-bar 6 one end of which is threaded for the engagement of a nut 7.

8 designates the usual spring, fixed to the leg 2 by a screw 9.

The leg 3 has a projection 10 having a diagonally arranged threaded aperture or recess 11 for the engagement of the threads of an adjusting-screw 12 having a knurled and notched head 13, a tip 15 and an annular or cylindrical constricted intermediate portion 14. The spacing-plate 6 is slidably seated in a transversely arranged opening 17 in the leg 3 and lies in contact with the constricted portion 14 and may be locked in any selective position, relative to the leg 3, by turning the threads of said screws 12 to engage the threads in the aperture 11, the shoulder 18 bearing against the arciform edge of the segment.

In the modification shown in Figs. 2 and 4 the screw 19 has a cutaway portion 20 in one side. The leg 3' is provided with a projection 10' having an aperture 11' in which the screw 19 seats, the segment 6' moving in the opening 17'. Adjustments of the screw 19 may be made by threading the nut 22 tighter or looser thereon, whereby the segment will be locked in the mortise 17'.

Various changes may be made in the details of construction without departing from the spirit and scope of the invention.

Having thus described my invention I claim as new the following, to-wit:

1. In a tool, a pair of legs, an adjusting-plate secured to one leg and slidably connected with the other, and a screw having a constricted portion whereby upper and lower shoulders are provided, said plate adapted to be locked by one of said shoulders in the leg with which it is slidably connected.

2. In a tool, a relatively stationary leg and a relatively movable leg hinged thereto, an adjusting-plate secured to the first recited leg, the second recited leg having a diagonally arranged aperture, a screw threaded in said aperture, the same leg provided with a mortise in which said plate is adapted for movement, said screw adapted to be drawn into contact with said plate.

In witness whereof I hereunto affix my signature this 29th day of May, 1915.

ANDERSON M. STRUBLE.

Copies of this patent may be obtained for five cents each, by addressing the "Commissioner of Patents, Washington, D. C."